Oct. 2, 1951 V. B. SNYDER 2,569,736
MULTIPLE DRILL TRACTOR HITCH
Filed April 7, 1948 2 Sheets-Sheet 1
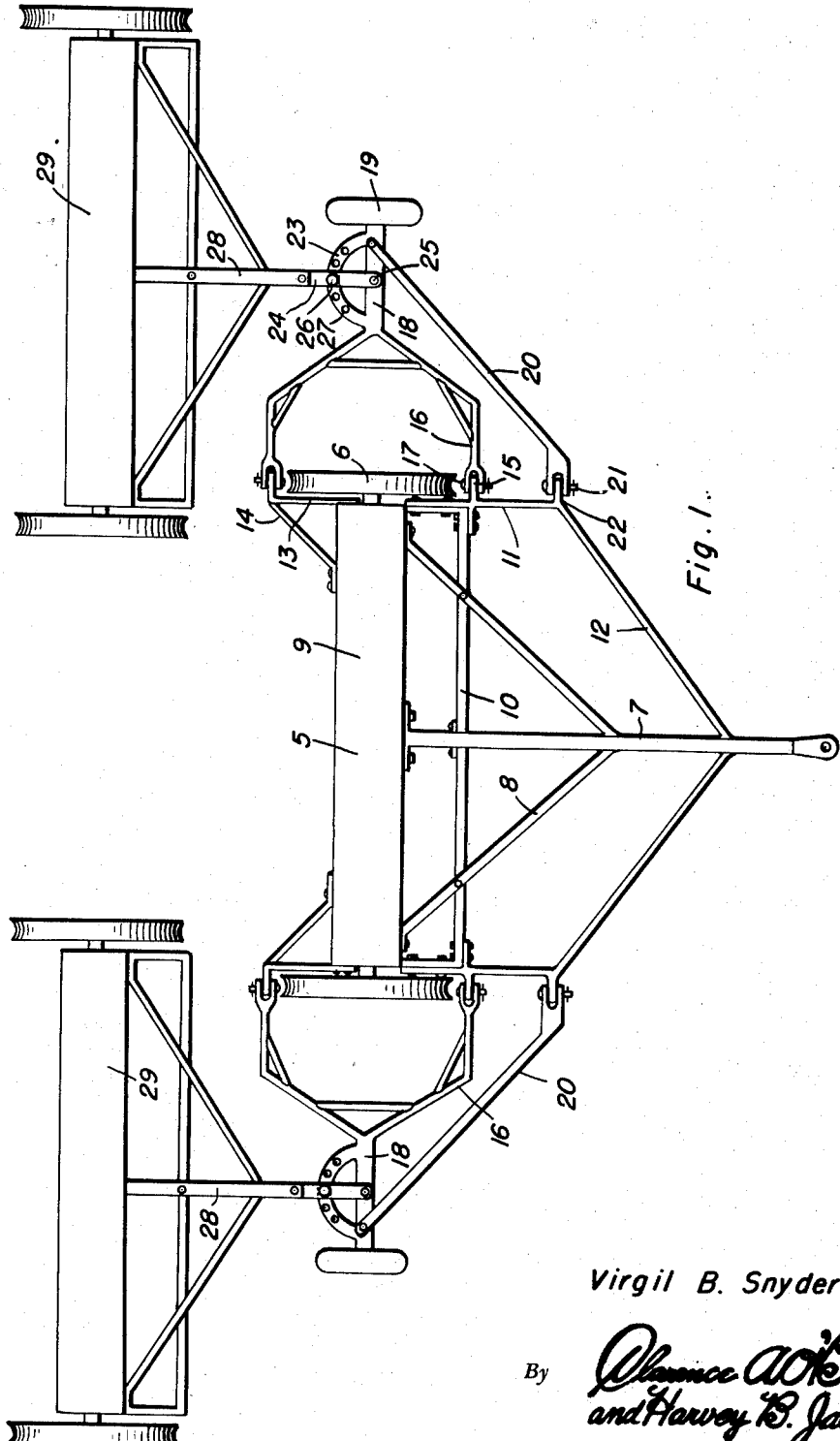
Inventor
Virgil B. Snyder
By *Clarence A. O'Brien*
and *Harvey B. Jacobson*
Attorneys Oct. 2, 1951 V. B. SNYDER 2,569,736
MULTIPLE DRILL TRACTOR HITCH
Filed April 7, 1948 2 Sheets-Sheet 2
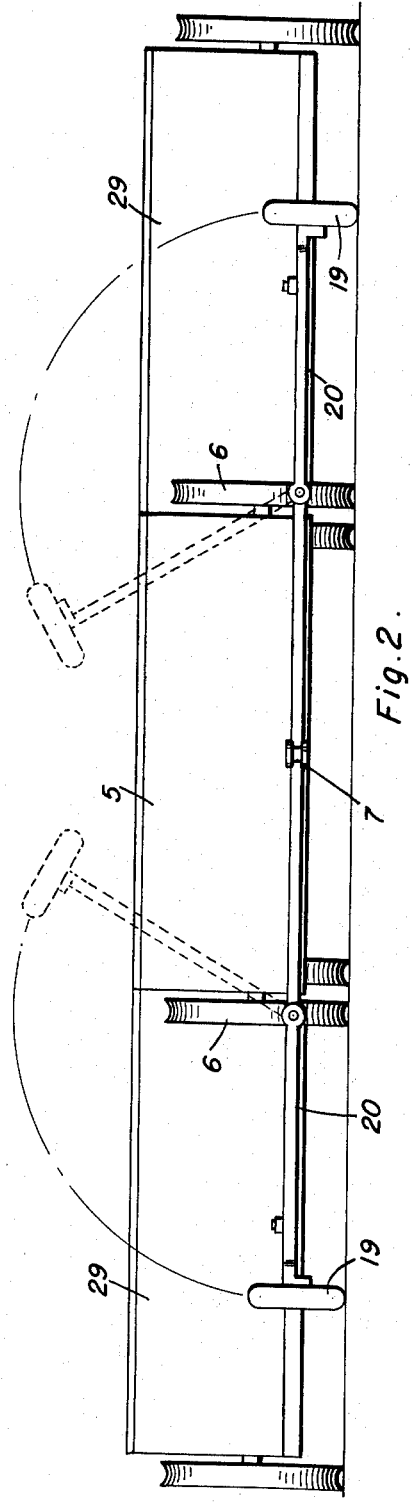
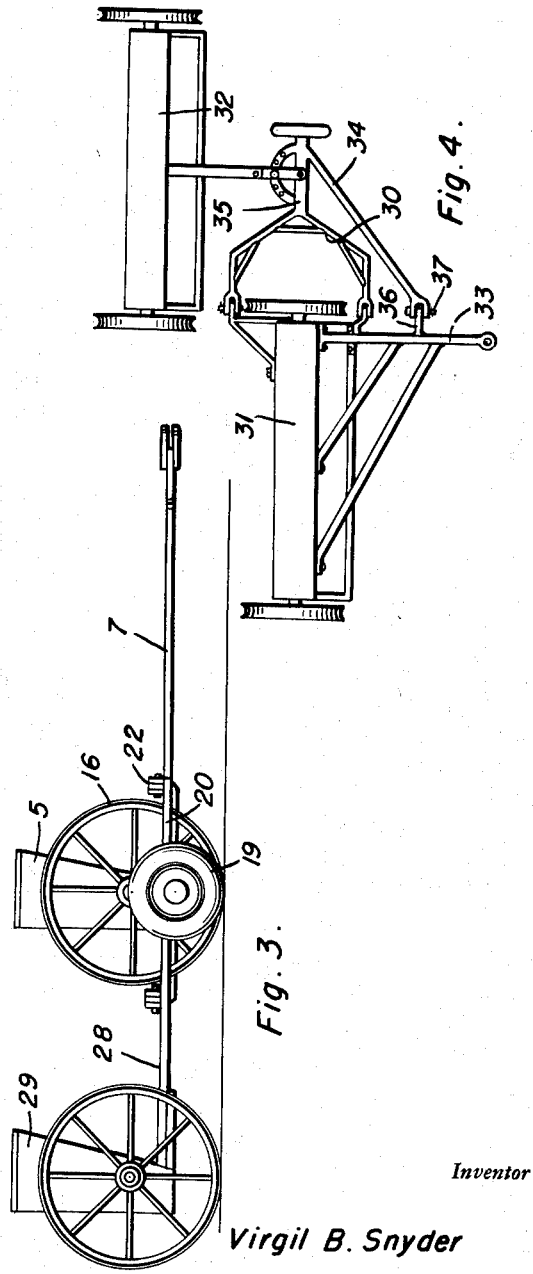
Inventor
Virgil B. Snyder
By Clarence A. O'Brien
and Harvey B. Jackson
Attorneys Patented Oct. 2, 1951

2,569,736

UNITED STATES PATENT OFFICE 2,569,736

MULTIPLE-DRILL TRACTOR HITCH

Virgil B. Snyder, Washtucna, Wash.

Application April 7, 1948, Serial No. 19,609

1 Claim. (Cl. 280—33.44)

The present invention relates to new and useful improvements in hitches for farm implements and more particularly to a multiple drill hitch for use with tractors.

An important object of the invention is to provide a hitch of this character wherein several drills can be pulled by a tractor and the drills maintained in trailing alignment.

A further object of the invention is to provide a drill hitch construction attached at one or both sides of a drill and whereby additional drills may be drawn in a trailing relation with respect to a main tractor drawn drill.

Another object of the invention is to provide vertically swingable drill hitches at the sides of a main tractor drawn drill which may be raised and lowered into and out of position on top of the main drill box for conveniently moving or storing the same, when not in use, and supporting the outer ends of the drill hitch on wheels to facilitate its movement over a field, when in use for pulling an auxiliary drill.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view showing a main tractor drawn drill provided with auxiliary drill hitches at each side thereof;

Figure 2 is a front elevational view;

Figure 3 is a side elevational view, and

Figure 4 is a top plan view illustrating the arrangement of a main tractor drawn drill with a single drill hitch at one side thereof.

Referring now to the drawings in detail wherein for the purpose of illustration I have disclosed a preferred embodiment of the invention the numeral 5 designates generally a main tractor drawn drill supported on wheels 6 at each side thereof and provided with a forwardly extending tongue or draw bar 7 for attaching the main drill to a tractor or other towing vehicle.

A pair of rear braces 8 extend from the draw bar 7 in an inclined position for attaching to the front of the drill box 9 adjacent the sides thereof and a U-shaped frame 10 is positioned horizontally in front of the drill box 9 and secured to the braces 8.

Arms 11 extend forwardly from the sides of the U-shaped frame 10 and are suitably secured thereto, the front ends of the arms having inclined braces 12 attached to the draw bar 7 adjacent the front end thereof.

Arms 13 also extend rearwardly from the sides of the drill box 9 and provided with braces 14, the arms 11 and 13 being formed with outwardly projecting apertured ears 15 to which a substantially fork shaped hitch 16 is pivotally attached at its inner end by pins 17 carried by the ears.

The fork shaped hitch 16 includes an outwardly extending stub shaft 18 at its outer end on which a wheel 19 is journalled and a forwardly inclined brace 20 is secured at one end adjacent the outer end of shaft 18 and its inner end pivoted to a pin 21 carried by a front apertured ear 22 on the forwardly extending arm 11, the hitch 16 and brace 20 being pivoted to the front and rear arms 11 and 13 for vertical swinging movement into and out of position on top of the main drill box 9.

An arcuate draw bar plate 23 is carried rearwardly of the shaft 18 and a draw bar 24 is pivoted as at 25 at its front end to the shaft 18 for horizontal swinging movement and is secured in swingably adjusted position by a pin 26 selectively received in opening 27 in the plate 23. A drill draw bar or tongue 28 is pivoted to the rear end of draw bar 24, the draw bar 28 extending from an auxiliary drill 29 to be drawn by hitch 16 rearwardly at one side of the main drill 5.

In the form of invention illustrated in Figures 1 to 3 inclusive I have illustrated a hitch 16 carried at each side of the main drill 5 and by means of which a pair of auxiliary drills 29 may be drawn by the main drill, at each side thereof.

In Figure 4 I have illustrated a modified construction wherein the drill hitch designated generally at 30 is carried at one side only of the main drill 31 for drawing a single auxiliary drill 32 at one side of the main drill. In this construction the tongue or draw bar 33 for the main drill is positioned adjacent its side provided with the hitch 30 to equalize the pulling force subjected thereto and a brace 34 for the outer ends of shaft 35 is pivoted directly to the draw bar 33 by means of an apertured lug 36 and pin 37. The hitch 30 is vertically swingable into and out of position on top of the main drill 31 in the same manner as heretofore described.

When the drill hitch 16 or 30 is not used for pulling an auxiliary drill the drill hitch may be raised into a position on top of the main drill to conveniently carry the hitch or to store the hitch with the drill.

The auxiliary hitches are free to swing on the draw bars 24 carried by the hitches to prevent sliding or dragging of the auxiliary drills, when the main drill is being turned.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a main trailer type farm implement including a frame, a hitch connecting an auxiliary implement to the main implement and comprising a Y-shaped frame including a forked inner end and an arm at its outer end at the center of the forked end, means pivotally connecting the forked end of the second frame to one side of the main implement frame for vertical swinging movement of the hitch into and out of position on top of the main implement, a stub axle at the outer end of the arm substantially co-planar therewith and having a wheel journaled thereon, a drawbar for the auxiliary implement attached to the arm of the second frame at a point between the forked portion and the axle, a brace fixed at one end to the arm at a point outwardly of the drawbar and inclined in a forward direction, and means pivotally attaching the outer end of the brace to the frame of the main implement at a point forwardly of the second frame for swinging the brace with said second frame, said forked inner end of the second frame distributing stresses subjected to the arm by the pulling force of an auxiliary implement attached to the drawbar, and said brace reinforcing the outer end of the arm.

VIRGIL B. SNYDER.

REFERENCES CITED

The following references are of record in the file of this patent:

UNITED STATES PATENTS

| Number | Name | Date |
|---|---|---|
| 829,766 | Chase | Aug. 28, 1906 |
| 1,835,592 | Carlson | Dec. 8, 1931 |
| 2,021,840 | Ellis et al. | Nov. 19, 1935 |
| 2,081,083 | Beebe | May 18, 1937 |
| 2,142,016 | Branch | Dec. 27, 1938 |
| 2,334,729 | Sefcovic | Nov. 23, 1943 |